(12) United States Patent
Schumacher et al.

(10) Patent No.: US 7,491,375 B2
(45) Date of Patent: *Feb. 17, 2009

(54) PYROGENICALLY PRODUCED SILICON DIOXIDE POWDER

(75) Inventors: Kai Schumacher, Hofheim (DE); Dieter Kerner, Hanau (DE); Roland Schilling, Freigericht (DE); Juergen Flesch, Lorrach (DE); Thomas Schiener, Alzenau (DE)

(73) Assignee: Degussa AG, Duesseldorf (DE)

( * ) Notice: Subject to any disclaimer, the term of this patent is extended or adjusted under 35 U.S.C. 154(b) by 316 days.

This patent is subject to a terminal disclaimer.

(21) Appl. No.: 11/084,170

(22) Filed: Mar. 21, 2005

(65) Prior Publication Data

US 2006/0155052 A1    Jul. 13, 2006

(30) Foreign Application Priority Data

Jan. 12, 2005    (DE) .................. 10 2005 001 408

(51) Int. Cl.
*C01B 33/12*    (2006.01)
(52) U.S. Cl. ..................................... 423/335; 423/337
(58) Field of Classification Search .................. 524/588
See application file for complete search history.

(56) References Cited

U.S. PATENT DOCUMENTS

| | | | | | |
|---|---|---|---|---|---|
| 4,565,682 | A | * | 1/1986 | Loskot et al. | 423/336 |
| 5,340,560 | A | * | 8/1994 | Rohr et al. | 423/337 |
| 6,328,944 | B1 | * | 12/2001 | Mangold et al. | 423/278 |
| 6,551,567 | B2 | * | 4/2003 | Konya et al. | 423/337 |
| 6,613,300 | B2 | * | 9/2003 | Mangold et al. | 423/278 |
| 6,800,413 | B2 | * | 10/2004 | Barthel et al. | 430/108.3 |
| 2002/0102199 | A1 | * | 8/2002 | Nishimine et al. | 423/337 |
| 2004/0253164 | A1 | | 12/2004 | Mangold et al. | |
| 2005/0215696 | A1 | * | 9/2005 | Scholz et al. | 524/493 |

FOREIGN PATENT DOCUMENTS

| | | |
|---|---|---|
| DE | 102 58 858 A1 | 8/2004 |
| EP | 1 486 461 A1 | 12/2004 |
| GB | 2044738 A * | 10/1980 |
| WO | WO 2004/054928 A1 | 7/2004 |
| WO | WO 2005/095503 A1 | 10/2005 |

* cited by examiner

*Primary Examiner*—Randy Gulakowski
*Assistant Examiner*—Robert Loewe
(74) *Attorney, Agent, or Firm*—Oblon, Spivak, McClelland, Maier & Neustadt, P.C.

(57) ABSTRACT

Pyrogenically produced silicon dioxide powder in the form of aggregates of primary particles having a BET surface area of 200±25 m$^2$/g, wherein the aggregates display an average surface area of 7000 to 12000 nm$^2$, an average equivalent circle diameter (ECD) of 80 to 100 nm and an average circumference of 850 to 1050 nm. It is produced by a pyrogenic process in which silicon tetrachloride and a second silicon component comprising $H_3SiCl$, $H_2SiCl_2$, $HSiCl_3$, $CH_3SiCl_3$, $(CH_3)_2SiCl_2$, $(CH_3)_3SiCl$ and/or $(n-C_3H_7)SiCl_3$ are mixed with primary air and a combustion gas and burnt into a reaction chamber, secondary air also being introduced into the reaction chamber, and the feed materials being chosen such that an adiabatic flame temperature of 1570 to 1630° C. is obtained. It can be used as a filler.

3 Claims, No Drawings

PYROGENICALLY PRODUCED SILICON DIOXIDE POWDER

BACKGROUND OF THE INVENTION

Field of the Invention

The invention concerns a pyrogenically produced silicon dioxide powder, its production and use. The invention also concerns a polyester containing the pyrogenically produced silicon dioxide powder.

Flame hydrolysis for the production of silicon dioxide is a process that has long been known and is performed on an industrial scale. In this process an evaporated or gaseous hydrolysable silicon halide is mixed with a flame formed by burning a water-forming, hydrogen-containing fuel and an oxygen-containing gas. The combustion flame provides water for hydrolysis of the silicon halide and sufficient heat for the hydrolysis reaction. The silicon dioxide powder carried in the residual reaction gases is subjected to conventional cooling and solids separation processes. Silicon tetrachloride is usually used. The use of dichlorosilane, trichlorosilane is also known, however. If carbon-containing feed materials are used, such as e.g. methyl trichlorosilane, dimethyl dichlorosilane, methyl dichlorosilane, dibutyl dichlorosilane, ethyl trichlorosilane, propyl trichlorosilane, an oxidation process to convert the carbon into carbon dioxide also takes place.

As a consequence, a silicon dioxide powder which is formed in a process wherein both reaction types, namely flame hydrolysis and oxidation, take place is described as a pyrogenically produced silicon dioxide.

In the reaction, highly dispersed, non-porous primary particles are initially formed, which as the reaction continues coalesce to form aggregates which in turn can congregate to form agglomerates. The BET surface area of these primary particles is generally between 5 and 600 $m^2/g$. The powder displays free hydroxyl groups on its surface.

The silicon dioxide powder produced in this way is used in many areas of application, for example as a thickener in polymers, for example in polyester resins.

Polyester resins can be obtained by polycondensation of a polyhydric alcohol with a dicarboxylic acid. They usually contain a substance which acts as a thickener and as a comonomer during the curing process. This is generally styrene. Due to its excellent thickening action, pyrogenically produced silicon dioxide powder has long been used in polyester resins. In addition to the thickening action, great importance is also attached to the incorporation ability into the polyester. In the case of silicon dioxide powders produced by the prior art, often only one of these parameters is within a desired range. Furthermore, the individual parameters, thickening and incorporation ability, are also in need of improvement.

SUMMARY OF THE INVENTION

The object of the invention is therefore to provide a silicon dioxide powder displaying a good thickening action combined with a short incorporation time in polymers, particularly polyester resins.

A further object of the invention is to provide a process for the production of the silicon dioxide powder.

A further object of the invention is to provide a polyester resin containing the silicon dioxide powder according to the invention.

DETAILED DESCRIPTION OF THE PREFERRED EMBODIMENTS

The invention provides a pyrogenically produced silicon dioxide powder in the form of aggregates of primary particles, which
    has a BET surface area of 200±25 $m^2/g$, and in which the aggregates display
    an average surface area of 7000 to 12000 $nm^2$,
    an average equivalent circle diameter (ECD) of 80 to 100 nm and
    an average circumference of 850 to 1050 nm.

The BET surface area is determined here in accordance with DIN 66131.

The aggregate sizes are determined by image analysis using an H 7500 TEM device supplied by Hitachi and a MegaView II CCD camera supplied by SIS. The image magnification for analysis is 30000:1 with a pixel density of 3.2 nm. The number of particles analysed is greater than 1000. Preparation takes place in accordance with ASTM 3849-89. The lower threshold limit in terms of detection is 50 pixels.

The BET surface area can preferably be 200±15 $m^2/g$ and particularly preferably 200±10 $m^2/g$.

Furthermore, a pyrogenically produced silicon dioxide powder according to the invention can be preferred in which the aggregates display
    an average surface area of 7500 to 9000 $nm^2$,
    an average equivalent circle diameter of 83 to 90 nm and
    an average circumference of 870 to 1000 nm.

Furthermore, a pyrogenically produced silicon dioxide powder according to the invention can be preferred in which the maximum aggregate diameter is between 150 and 170 nm and the minimum aggregate diameter is between 90 and 110 nm.

Furthermore, a pyrogenically produced silicon dioxide powder according to the invention can be preferred in which the chloride content is less than 250 ppm. A chloride content of less than 50 ppm is particularly preferred.

Furthermore, a pyrogenically produced silicon dioxide powder according to the invention can be preferred in which the carbon content is less than 100 ppm. A carbon content of less than 25 ppm is particularly preferred.

At a concentration of 2.5 wt. % in a polyester resin dissolved in styrene with a starting viscosity of 1300±100 mPas (23° C.), the silicon dioxide powder according to the invention can bring about a thickening of more than 3400 mPas.

Furthermore, at a concentration of 2.5 wt. % in a polyester resin dissolved in styrene with a starting viscosity of 1300±100 mPas, the silicon dioxide powder according to the invention can bring about a wet-in time of 140 seconds or less.

The invention also provides a process for the production of the silicon dioxide powder according to the invention wherein
    a mixture of silicon compounds is evaporated, separately or together, the vapours are transferred by means of a carrier gas to a mixing chamber, with
        $SiCl_4$ as the first component in a proportion of 60 to 95 wt. % relative to the mixture, and
        a second component chosen from the group comprising $H_3SiCl$, $H_2SiCl_2$, $HSiCl_3$, $CH_3SiCl_3$, $(CH_3)_2SiCl_2$, $(CH_3)_3SiCl$, $(n-C_3H_7)SiCl_3$, in a proportion of 5 to 40 wt. %, relative to the mixture, and a combustion gas and primary air, which can optionally be enriched with oxygen and/or be preheated, are transferred separately to the mixing chamber, the mixture of the vapour of silicon chlorides, combustion gas and primary air is ignited in a burner and the flame burns into a reaction chamber, secondary air, which surrounds the flame, is introduced into the reaction chamber, the ratio of secondary air to primary air being in a range from 0.05 to 3, preferably 0.15 to 2, the solid is then separated from gaseous substances and the solid is then steam-treated at 250° C. to 750° C., wherein the total amount of oxygen is at least sufficient for the complete combustion of the combustion gas and the silicon compounds and the amount of feed materials consisting of silicon compounds, combustion gas, primary air and secondary air is chosen such that an adiabatic flame temperature $T_{ad}$ of 1570 to 1630° C. is obtained, where $T_{ad}$=the temperature of the feed materials+the sum of the reaction enthalpies of the partial reactions/heat capacity of the substances leaving the reaction chamber, comprising silicon dioxide, water, hydrogen chloride, carbon dioxide, oxygen, nitrogen, and optionally the carrier gas if it is not air or nitrogen, taking the specific heat capacity of these substances at 1000° C. as a basis.

The specific heat capacities can be determined with the aid of the VDI-Wärmeatlas, for example (section 7.1 to 7.3 and 3.7, $8^{th}$ edition).

The reaction of the silicon compounds in the presence of oxygen and a combustion gas yields silicon dioxide, water, hydrochloric acid and, in the case of carbon-containing silicon compounds and/or carbon-containing combustion gases, carbon dioxide. The reaction enthalpies of these reactions can be calculated by means of standard works known to the person skilled in the art.

Table 1 shows selected reaction enthalpy values for the reaction of silicon compounds in the presence of hydrogen and oxygen.

TABLE 1

| Reaction enthalpies | |
|---|---|
| | KJ/mol |
| $H_2$ | −241.8 |
| $SiCl_4$ | −620.1 |
| $SiHCl_3$ | −659.4 |
| $SiH_2Cl_2$ | −712.3 |
| $C_3H_7SiCl_3$ | −2700.2 |
| $CH_3SiCl_3$ | −928.3 |
| $(CH_3)_3SiCl$ | −2733.8 |

Methyl trichlorosilane (MTCS, $CH_3SiCl_3$), trichlorosilane (TCS, $SiHCl_3$) and/or dichlorosilane (DCS, $SiH_2Cl_2$) can particularly preferably be used.

Suitable combustion gases are hydrogen, methane, ethane, propane and/or natural gas, with hydrogen being preferred.

There is no restriction on the temperature of the feed materials, provided that it is above the boiling point of the highest boiling silicon compound. A temperature of the feed materials of 90° C.±40° C. has proved to be advantageous.

It can also be advantageous if the discharge velocity of the reaction mixture from the mixing chamber into the reaction chamber is 10 to 80 m/s.

The invention also provides a polyester containing the silicon dioxide powder according to the invention.

Polyesters are known compounds which are used inter alia in the production of textiles. They are described for example in Ullmann's Encyclopedia of Industrial Chemistry Vol. A 21 (1992) pages 227 to 251. The production of polyester fibres is known from Ullmann's Encyclopedia of Industrial Chemistry Vol. A 10 (1992) pages 579 to 613.

Mixtures of 0.1 to 100 percent of the silicon dioxide powder according to the invention with other pyrogenically produced or precipitated silicas or bentonites or other fillers conventionally used in the production of polyesters or mixtures of these fillers can be used.

Dispersions containing the silicon dioxide powder according to the invention and a glycol are preferably used to produce polyesters, the glycol, preferably ethylene glycol, being esterified with an organic acid by known means. The content of the silicon dioxide powder according to the invention in the dispersion can be up to 60 wt. %.

The invention also provides a silicone rubber compound containing the silicon dioxide powder according to the invention.

EXAMPLES

The BET surface area is determined in accordance with DIN 66131.

Wet-in time: 100 g of Ludopal® P6 (co-condensation product of 35 mol % phthalic anhydride and 65 mol % maleic anhydride with 2 propanediol, dissolved in styrene; BASF AG) are weighed into a 350 ml beaker and heated to 25° C. in a water bath. The beaker is placed in the aluminium insert of the holder in the high-speed mixer. The stirrer is immersed down to the specified depth t=10 mm above the base of the beaker and started at a speed of 500 $min^{-1}$. 3 g of silicon dioxide powder are poured evenly onto the surface of the resin and the stopwatch is started. The time taken for the silicon dioxide powder to sink into the polyester composition is measured.

Thickening action: 142.5 g of a solution of an unsaturated polyester resin in styrene with a viscosity of 1300±150 mPas are introduced into 7.5 g of silicon dioxide powder at a temperature of 22° C. and dispersed by means of a high-speed mixer at 3000 $min^{-1}$. A suitable example of an unsaturated polyester resin is Pallatal® P6-01, DSM Composite. A further 90 g of the unsaturated polyester resin in styrene are added to 60 g of this dispersion and the dispersion process is repeated. The thickening action is taken to be the viscosity value in mPas of the dispersion at 25° C., measured with a rotary viscometer at a shear rate of 2.7 $s^{-1}$.

Example 1

Production of a Silicon Dioxide Powder 70 kg/h of silicon tetrachloride and 35 kg/h of methyl trichlorosilane are evaporated and transferred to the mixing chamber of a burner by means of nitrogen. At the same time, 40 $Nm^3/h$ of hydrogen and 195 $Nm^3/h$ of primary air are introduced into the mixing chamber. The mixture displays a temperature of 90° C. It is ignited and burnt into a reaction chamber in a flame. In addition, 30 $Nm^3/h$ of secondary air, which surrounds the flame, are introduced into the reaction chamber.

The reaction gases and the silicon dioxide that is formed are drawn through a cooling system by application of a partial vacuum, cooling them to values between 100 and 160° C. The solid is separated from the waste gas stream in a filter or cyclone and then steam-treated at a temperature of 450° C.

Examples 2 to 11 Are Performed in the Same Way

Table 2 reproduces the feed materials and the amounts from Examples 1 to 11.

Table 3 shows the calculated values for reaction enthalpy, heat capacity and adiabatic flame temperature.

Table 4 shows analytical data for the silicon dioxide powders produced, and for three commercially available pyrogenically produced silicon dioxide powders (Examples 12 to 14).

Examples 1 to 5 produce powders according to the invention. Examples 5 to 10 are comparative examples.

In Example 2 three silicon components are used.

In Examples 3 and 4, high and low proportions of the first silicon component, silicon tetrachloride, are used respectively.

In Example 5 a high ratio of secondary air to primary air within the claimed range is established.

In Examples 6 and 7 settings are chosen which lead to an adiabatic flame temperature outside the claimed range.

In Example 8 only one silicon compound ($SiCl_4$) is used.

In Example 9 the ratio of silicon tetrachloride to the other silicon compounds is outside the claimed range.

In Example 10 no secondary air is introduced.

In Example 11 the ratio of secondary air to primary air is outside the claimed range.

The examples show that the silicon dioxide powder according to the invention from Examples 1 to 5 displays markedly shorter wet-in times and a markedly greater thickening action than the samples from comparative examples 6 to 13.

The examples also show that the average aggregate surface area, the average ECD, the average aggregate circumference, the average maximum aggregate diameter and the average minimum aggregate diameter of the silicon dioxide powders according to the invention are smaller than the corresponding values for the comparative examples, with the exception of the commercially available silicon dioxide powder from Example 14. In this case the average aggregate surface area and the average aggregate circumference are smaller than in the silicon dioxide powders from the examples according to the invention, but the wetting time is longer and the thickening action is less strong.

Examples 1 to 5 also show how a specific narrow adiabatic flame temperature range, in this case 1573 to 1629° C., can be obtained by varying the amounts of feed materials.

Comparative examples 6 and 7 also show that with the same composition of silicon compounds as in Example 1, silicon dioxide powders according to the invention are not obtained. The powders obtained display BET surface areas outside the claimed range. In comparative examples 6 and 7, the adiabatic flame temperatures are outside the claimed range.

In comparative examples 8 to 10, the adiabatic flame temperatures are within the claimed range, but silicon dioxide powders according to the invention are not obtained.

In Examples 8 to 10 the composition of the silicon compounds is outside the claimed range. As Table 4 shows, powders are obtained whose average aggregate surface areas, average ECD, average aggregate circumferences, average maximum aggregate diameters and average minimum aggregate diameters are larger than those of the silicon dioxide powders according to the invention.

In Example 11 the ratio of secondary air to primary air of 3.33 is outside the claimed range. The silicon dioxide powder obtained displays a BET surface area that is well outside the claimed range.

TABLE 2

Feed materials and amounts used

| | | According to the invention | | | | | Comparison | | | | |
|---|---|---|---|---|---|---|---|---|---|---|---|
| | | Example | | | | | | | | | |
| | | 1 | 2 | 3 | 4 | 5 | 6 | 7 | 8 | 9 | 10 | 11 |
| Silicon tetrachloride | kg/h | 70 | 70 | 100 | 65 | 11 | 70 | 70 | 100 | 1 | 65 | 1 |
| 2nd silicon component[$] | kg/h | MTCS 35 | MTCS 20 | TCS 25 | PTS 35 | MTCS 2 | MTCS 35 | MTCS 35 | — | MTCS 8 | PTS 35 | MTCS 8 |
| 3rd silicon component[$] | kg/h | | PTS 15 | | | | | | | | | |
| Hydrogen | $Nm^3/h$ | 40 | 34 | 41 | 31 | 11 | 46 | 36 | 32 | 3.5 | 31 | 17 |
| Primary air | $Nm^3/h$ | 195 | 215 | 140 | 270 | 15 | 195 | 195 | 85 | 25 | 310 | 18 |
| Secondary air | $Nm^3/h$ | 30 | 30 | 30 | 40 | 30 | 30 | 30 | 30 | 5 | 0 | 60 |
| Secondary air/primary air | | 0.15 | 0.13 | 0.21 | 0.15 | 2 | 0.15 | 0.15 | 0.35 | 0.20 | 0 | 3.33 |
| Inlet temperature(*) | ° C. | 90 | 90 | 90 | 90 | 90 | 90 | 90 | 90 | 90 | 90 | 90 |
| $V_{burner}^{(+)}$ | m/s | 42.5 | 44.9 | 33.6 | 53.8 | 45.5 | 43.6 | 41.8 | 22.4 | 60.4 | 61.2 | 55.6 |

(*)For mixture of $H_2$, primary air, $SiCl_4$, $2^{nd}$ and optionally $3^{rd}$ silicon component

[$]MTCS = methyl trichlorosilane; TCS = trichlorosilane; DCS = dichlorodisilane, MTS = methyl trichlorosilane;

(+) = discharge velocity from burner

TABLE 3

Reaction enthalpy, heat capacity and adiabatic flame temperature

| | | According to the invention Example | | | | | | Comparison | | | | |
|---|---|---|---|---|---|---|---|---|---|---|---|---|
| | | 1 | 2 | 3 | 4 | 5 | 6 | 7 | 8 | 9 | 10 | 11 |
| Sum of reaction enthalpies from partial reactions | KW | −196.1 | −215.6 | −166.7 | −255.5 | −38.9 | −214.0 | −184.1 | −118.3 | −24.6 | −255.5 | −65 |
| Heat capacity of products | KJ/s · K | 0.13 | 0.14 | 0.11 | 0.17 | 0.03 | 0.13 | 0.13 | 0.08 | 0.02 | 0.17 | 0.04 |
| Adiabatic flame temperature | °C. | 1573 | 1629 | 1595 | 1615 | 1581 | 1685 | 1497 | 1580 | 1585 | 1627 | 1616 |

TABLE 4

Analytical data for silicon dioxide powders

| | | According to the invention Example | | | | | | | Comparison | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12[$] | 13[&] | 14[§] |
| BET surface area | m²/g | 213 | 204 | 210 | 207 | 212 | 145 | 253 | 206 | 208 | 201 | 204 | 201 | 205 | 214 |
| Average aggregate surface area | nm² | 8838 | 9001 | 7663 | 8951 | 7433 | nd | nd | 10667 | 9849 | 12822 | nd | 11806 | 11267 | 6658 |
| Average ECD | nm | 88 | 89 | 82 | 91 | 82 | nd | nd | 102 | 92 | 101 | nd | 96 | 99 | 73 |
| Average aggregate circumference | nm | 996 | 985 | 870 | 886 | 861 | nd | nd | 1029 | 1067 | 1281 | nd | 1195 | 1135 | 1050 |
| Average max. aggregate Ø | nm | 168 | 170 | 153 | 169 | 152 | nd | nd | 180 | 174 | 198 | nd | 185 | 188 | 142 |
| Average min. aggregate Ø | nm | 103 | 104 | 94 | 103 | 91 | nd | nd | 111 | 107 | 124 | nd | 113 | 116 | 89 |
| Av. primary particle Ø | nm | 10 | 10.8 | 10.5 | 9.8 | 9.6 | nd | nd | 11.7 | 10.9 | 11.8 | nd | 11 | 11.5 | 7 |
| C content | ppm | 1 | 2 | <1 | 4 | 6 | nd | nd | <1 | 3 | 8 | 2 | <1 | 5 | 3 |
| Cl content | ppm | 12 | 8 | 15 | 22 | 28 | nd | nd | 21 | 34 | 12 | 7 | 4 | 6 | 9 |
| Thickening | mPas | 3970 | 3812 | 3661 | 4010 | 3800 | nd | nd | 3483 | 3805 | 3815 | 3796 | 3280 | 3327 | 3740 |
| Wet-in time | sec | 63 | 102 | 48 | 114 | 81 | nd | nd | 331 | 225 | 489 | 891 | 162 | 184 | 144 |

[$]AE 200, Degussa;
[&]Wacker HDK N20;
[§]14: Cabosil HP 60, Cabot;
nd = not determined

The invention claimed is:

1. A process for the production of a composition comprising a pyrogenically produced silicon dioxide powder in the form of aggregates of primary particles, wherein the composition
has a BET surface area of 200±25 m²/g and the aggregates display
an average surface area of 7000 to 12000 nm²,
an average equivalent circle diameter (ECD) of 80 to 100 nm and
an average circumference of 850 to 1050 nm; and wherein in the process
a mixture of silicon compounds is evaporated, separately or together, the vapours are transferred by means of a carrier gas to a mixing chamber, with
$SiCl_4$ as the first component in a proportion of 60 to 95 wt. % relative to the mixture, and
a second component chosen from the group comprising $H_3SiCl$, $H_2SiCl_2$, $HSiCl_3$, $CH_3SiCl_3$, $(CH_3)_2SiCl_2$, $(CH_3)_3SiCl$, $(n\text{---}C_3H_7)SiCl_3$, in a proportion of 5 to 40 wt. %, relative to the mixture,
and a combustion gas and primary air, which can optionally be enriched with oxygen and/or be preheated, are transferred separately to the mixing chamber,
the mixture of the vapour of silicon chlorides, combustion gas and primary air is ignited in a burner and the flame burns into a reaction chamber,
secondary air, which surrounds the flame, is introduced into the reaction chamber, the ratio of secondary air to primary air being in a range from 0.05 to 3,
the solid is then separated from gaseous substances and the solid is then steam-treated at 250° C. to 750° C.,
wherein
the total amount of oxygen is at least sufficient for the complete combustion of the combustion gas and the silicon compounds and
the amount of feed materials consisting of silicon compounds, combustion gas, primary air and secondary air is chosen such that an adiabatic flame temperature $T_{ad}$ of 1570 to 1630° C. is obtained, where $T_{ad}$=the temperature of the feed materials+the sum of the reaction enthalpies of the partial reactions/heat capacity of the substances leaving the reaction chamber, comprising silicon dioxide, water, hydrogen chloride, carbon dioxide, oxygen, nitrogen, and optionally the carrier gas if it is not air or nitrogen, taking the specific heat capacity of these substances at 1000° C. as a basis.

2. The process according to claim 1, wherein the temperature of the feed materials is 90° C.±40° C.

3. The process according to claim 1, wherein the discharge velocity of the reaction mixture from the mixing chamber to the reaction chamber is 10 to 80 m/s.

* * * * *